United States Patent

Abe et al.

[15] 3,668,200
[45] June 6, 1972

[54] PROCESS FOR THE PRODUCTION OF ISOXAZOLYL PENICILLINS

[72] Inventors: Jinnosuke Abe, Yoshida; Tetsuo Watanabe, Yokohama-shi; Teruo Take, Tagata-gun; Kentaro Fujimoto, Tagata-gun; Tadashiro Fujii, Tagata-gun; Kazunari Takemura, Tagata-gun; Kazuyoshi Nishiie, Numazu-shi; Sakae Satoh, Sakai-shi; Tadashi Koide; Yasue Hotta, both of Tagata-gun, all of Japan

[73] Assignee: Toyo Jozo Kabushiki Kaisha, Tagata-gun, Japan

[22] Filed: Sept. 24, 1969

[21] Appl. No.: 860,812

[52] U.S. Cl. ...................................... 260/239.1, 424/271
[51] Int. Cl. ........................................... C07d 99/16
[58] Field of Search .............................. 260/239.1

[56] References Cited

UNITED STATES PATENTS 2,996,501  8/1961  Doyle et al. .................... 260/239.1
3,239,507  3/1966  Nayler .......................... 260/239.1

*Primary Examiner*—Nicholas S. Rizzo
*Attorney*—Young and Thompson

[57] ABSTRACT

A chemical process for the production of isoxazolyl penicillins and nontoxic salts and lower alkyl esters thereof having the formula

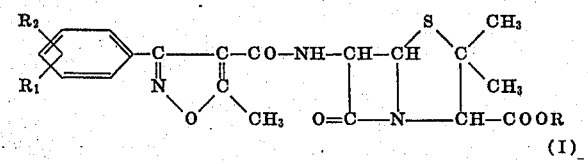

(I)

requires no microbiological deacylation or fermentation to produce 6-aminopenicillanic acid, but instead comprises reacting a penicillin G ester having the formula

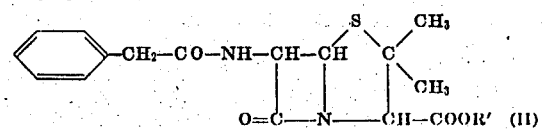

(II)

wherein R'. is a protective group for carboxyl group and is selected from the group consisting of lower alkyl and a group which, when subjected to an elimination reaction, can be easily eliminated without having any detrimental effect on the structure of penicillin, which a chlorinating agent in the presence of a tertiary organic base to obtain an imide chloride group-incorporated compound having the formula

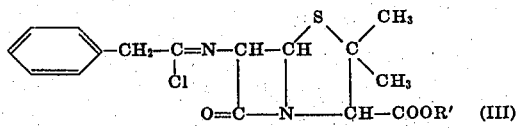

(III)

wherein R' is as defined above; reacting the compound of Formula III with an isoxazol carboxylate having the formula

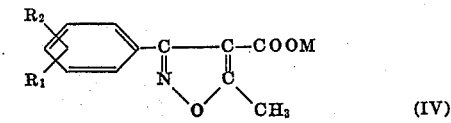

(IV)

wherein M is a metal atom, and $R_1$ and $R_2$ are as defined above, to obtain a diacyl penicillin ester having the formula

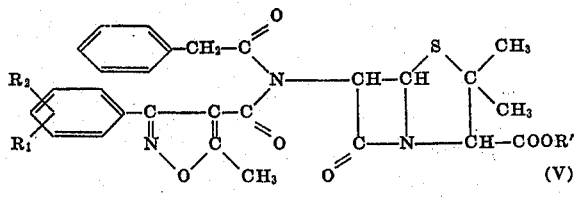

(V)

wherein $R_1$, $R_2$ and R' are as defined above; then subjecting the compound of Formula V to dephenylacetylation; and eliminating R' when R' is a said easily eliminated group.

6 Claims, No Drawings

PROCESS FOR THE PRODUCTION OF ISOXAZOLYL PENICILLINS

This invention relates to a process for production of isoxazolyl penicillins having the formula

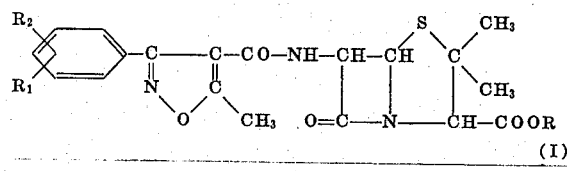

wherein R represents hydrogen or a lower alkyl group, and $R_1$ and $R_2$ are the same or different and each represents hydrogen or a halogen atom.

More particularly, the invention pertains to a process for preparing isoxazolyl penicillins represented by said Formula I, or nontoxic salts or lower alkyl esters thereof, characterized in that a penicillin G ester having the formula

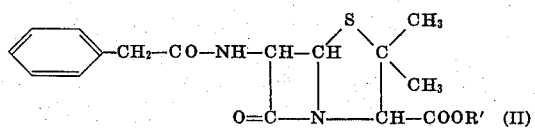

wherein R' is a protective group for carboxyl group and represents a lower alkyl group or a group which can be easily eliminated without having any detrimental effect on the structure of penicillin, is reacted with a chlorinating agent in the presence of a tertiary organic base to obtain an imide chloride group-incorporated compound having the formula

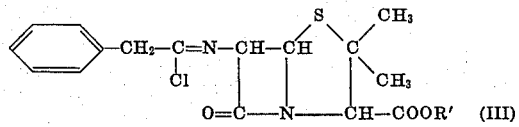

wherein R' is as defined above; the compound of Formula III is reacted with an isoxazol carboxylate represented by the formula

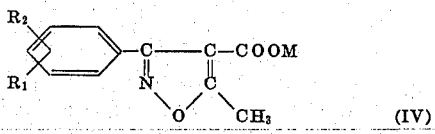

wherein M represents a metal atom, and $R_1$ and $R_2$ are as defined previously, to obtain a diacyl penicillin ester represented by the formula

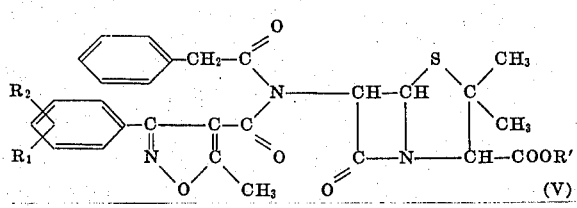

wherein $R_1$, $R_2$ and R' are as defined previously; and then the compound of Formula V is subjected to dephenylacetylation, and in case R' in Formula V is a group capable of being easily eliminated without having any detrimental effect on the structure of penicillin, the resulting product is so treated as to eliminate the protective group for carboxyl group.

Heretofore, isoxazolyl penicillins have been prepared in such a manner that 6-aminopenicillanic acid prepared by microbiological deacylation of penicillin G or V obtained by fermentation, or 6-aminopenicillanic acid obtained by direct fermentation, is acylated according to such an acylation process as the acid halide process, acid anhydride process, mixed acid anhydride process, active ester process or process using a condensing agent (dicyclohexyl carbodiimide or carbonyl imidazole) as for example in U.S. Pat. No. 2,996,501. According to these processes, however, the amphoteric compound 6-aminopenicillanic acid should be isolated from the fermentation liquor and, due to the troublesomeness of the isolation step, the lowering of yield has been unavoidable.

The present invention is characterized by the fact that isoxazolyl penicillins are prepared chemically without using 6-aminopenicillanic acid but using as a starting material inexpensive penicillin G obtainable by fermentation.

An object of the present invention is to provide a novel process for preparing isoxazolyl penicillins which is entirely different from the conventional processes for preparing semi-synthetic penicillins by acylating 6-aminopenicillanic acid.

In the present invention, penicillin G obtained by fermentation is used as a starting material. However, the penicillin G is not used as it is but is used in the form of an ester such as penicillin G ester represented by Formula II (hereinafter said ester will be referred to as "the penicillin G ester II") which is formed by introducing a protective group into the carboxyl group of penicillin G.

The carboxyl group of penicillin G is protected so that no side reaction will be brought about in the subsequent reaction, i.e. the reaction with a chlorinating agent.

The above-mentioned introduction of a protective group is carried out by introducing into a potassium or sodium salt of penicillin G obtained by fermentation such a protective group as is used ordinarily in the synthesis of peptides. Examples of protective groups which may be introduced are methyl, ethyl, t-butyl, p-methoxybenzyl, benzyl, p-nitrobenzyl, benzhydril, phenacyl, p-bromophenacyl and trimethylsilyl groups. Generally, however, the protective group introduced should be eliminated in the final step and therefore it is desirable to select a group capable of being easily eliminated without having any detrimental effect on the structure of penicillin. Favorable results are obtained by the use of such protective groups as, for example, benzyl, p-nitrobenzyl and benzhydril groups which can be easily eliminated by catalytic reduction, or phenacyl and p-bromophenacyl groups which can be eliminated with sodium thiophenoxide or thiophenolate.

Generally, penicillins are unstable to acids and alkalis. Accordingly, when such a protective group which is eliminated by acid or alkali hydrolysis, e.g. a methyl, ethyl, t-butyl or p-methoxybenzyl group, has been introduced, the elimination thereof is difficult because the destruction of the structure of the penicillin is brought about at the time of the elimination reaction. In the present invention, however, even when the final products, i.e. isoxazolyl penicillins, are in the form of esters having protective groups, the object of the invention can be accomplished without eliminating the protective groups insofar as the protective groups are those of the kind which do not have pharmacologically detrimental effects. Examples of such protective groups are lower alkly groups such as methyl, ethyl and the like groups.

In accordance with the present invention, the penicillin G ester II is reacted with a chlorinating agent to obtain an imide chloride group-incorporated compound represented by Formula III (hereinafter said compound will be referred to as "the imide chloride III"). The above reaction is an application of a process in which an N-mono-substituted carboxylic acid amide is treated with a chlorinating agent to produce a corresponding imide chloride group-incorporated compound, and it is most preferable to adopt a process in which the reaction is effected, in the presence of a tertiary organic base, using such chlorinating agents as $PCl_5$, $PCl_3$, $POCl_3$, $COCl_2$, $SOCl_2$, etc., $PCl_5$ being preferred. See South African Pat. No. 67/2927.

In the above-mentioned reaction, it is preferable to use a suitable dry organic solvent. This solvent is preferably selected with regard to the fact that it should not substantially detrimentally affect the reaction; that it should be able to solubilize the penicillin G ester II; and that it should be an organic solvent immiscible with water because, after the reaction, byproducts formed are removed by washing. For example, benzene, toluene, chloroform, dichloromethane, dichloroethane, ethyl ether or isopropyl ether are advantageously used.

If $PCl_5$, for example, is used in the above reaction as the chlorinating agent, $POCl_3$ and HCl are necessarily formed. In case a hydrochloride of the tertiary organic base has precipitated in the reaction liquid, it is first removed by filtration and, since the imide chloride III obtained is relatively stable to water, $POCl_3$ can be removed from the reaction liquid by washing with an aqueous weakly alkali solution, e.g. an aqueous sodium or potassium bicarbonate solution. It is desirable that the above washing operation be carried out as quickly as possible and, after the washing, that the reaction mother liquor be immediately dried by addition of anhydrous sodium sulfate or magnesium sulfate.

In view of the fact that compounds having imide chloride groups are unstable in water, in general, it is very surprising that the imide chloride III obtained by the aforesaid reaction is relatively stable in water. Further, it is extremely favorable that, by the above-mentioned operation, a reaction mother liquor containing the imide chloride III can be obtained in a stable state.

In the above-mentioned reaction mother liquor, unreacted tertiary organic base remains as it is. This base can be easily removed from the reaction mother liquor as a water-soluble acid addition salt by washing the liquor with a dilute acid. However, the imide chloride III is unstable in acids and therefore it is desirable that said base not be removed. As the tertiary organic base employed in the present invention, therefore, the use of such a weak base as pyridine, for example, gives favorable results. This is because in the subsequent reaction, i.e. in the step where the imide chloride III is reacted with an isoxazol carboxylate represented by Formula IV (hereinafter said carboxylate will be referred to as "the carboxylate IV") to form a diacyl penicillin ester represented by Formula V (hereinafter said ester will be referred to as "the diacyl penicillin ester V"), if a strongly basic tertiary organic amine, e.g. triethylamine or the like, is present, there is danger that a stereochemical rearrangement (epimerization) may take place in the hydrogen atom at the 6-position of the penicillin nucleus; but in the presence of such a weak base as pyridine, there is little danger of epimerization.

The imide chloride III contained in the above-mentioned reaction mother liquor may be reacted as is, without any further purification, with the carboxylate IV. Alternatively, it may be reacted with the carboxylate IV after concentrating the reaction mother liquor and dispersing the concentrate in another suitable solvent, e.g. benzene, toluene, chloroform, dichloromethane, dichloroethane, ethyl ether, isopropyl ether, tetrahydrofuran or dioxane. However, an aqueous solution treatment is effected after the reaction and therefore it is advantageous to use a water-immiscible solvent.

Examples of the carboxylate IV to be reacted with the imide chloride III are metal salts, such as potassium, sodium, lithium and silver salts, of 3-phenyl-5-methyl-isoxazol-4-carboxylic acid, 3-(2'-chlorophenyl)-5-methyl-isoxazol-4-carboxylic acid, 3-(2'-bromophenyl)-5-methyl-isoxazol-4-carboxylic acid, 3-(2'-fluorophenyl)--flurophenyl)-5-methyl-isoxazol-4-carboxylic acid, 3-(2',6'-dichlorophenyl)-5-methyl-isoxazol-4 -carboxylic acid, 3-(2'-chloro-6'-fluorophenyl)-5-methyl-isoxazol-4-carboxylic acid and 3-(2'-bromo-6'-chlorophenyl)-5-methyl-isoxazol-4-carboxylic acid. The carboxylate IV may be added directly to the reaction mother liquor containing the imide chloride III or may be used in the form of a suspension in the same solvent as in the reaction mother liquor. In this case, if a strongly basic tertiary organic base such as triethylamine or the like is used in place of the carboxylate IV, there is danger that the resulting diacyl penicillin ester V may cause epimerization of the hydrogen atom in the 6-position of the penicillin nucleus, as mentioned previously. However, when a metal salt such as a potassium, sodium, lithium or silver salt is used, said epimerization can be prevented or the degree of epimerization can be greatly reduced.

Theoretically, the quantitative proportion of the carboxylate IV is equimolar to the imide chloride III. After the reaction, however, the removal of unreacted carboxylate IV is easier than the removal of unreacted imide chloride III. Ordinarily, therefore, the carboxylate IV is used somewhat in excess.

The above-mentioned reaction progresses readily at normal temperature and therefore no particular heating is necessary. However the reaction mixture may be heated to about 40° to 50° C. if the reaction rate is undesirably slow; but overheating or rapid heating should be avoided because of the decomposition of imide chloride III or diacyl penicillin ester V.

By the above reaction, there is obtained the diacyl penicillin ester V. In separating this reaction product, the reaction liquid is washed with an aqueous dilute acid solution, an aqueous dilute alkali solution, and water, in this order, to remove remaining tertiary organic base, e.g. pyridine or the like, and unreacted carboxylate IV, and then the reaction mother liquor is concentrated and is subjected to silica gel-column chromatography using a solvent of benzene-ethyl acetate or the like system, whereby only the desired diacyl penicillin ester V is initially eluted. When the eluted fraction is subjected to freeze-drying or the like, the product can be easily isolated.

The thus-obtained diacyl penicillin ester V can be subjected, without any further purification, to the subsequent reaction, i.e. to the dephenylacetylation reaction.

In the present invention, the phenylacetyl group of the diacyl penicillin ester V is eliminated to obtain an isoxazolyl penicillin ester represented by the formula

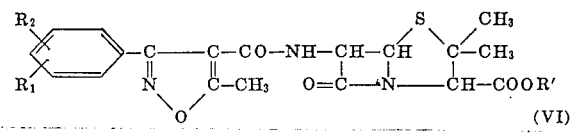

(VI)

wherein $R_1$, $R_2$ and $R'$ are as defined previously (hereinafter said ester will be referred to as "the isoxazolyl penicillin ester VI"). The elimination of said group may be effected according to any of such processes as aminolysis, solvolysis, hydrolysis, splitting by thiophenolate and the like. Of these, the processes using an aminolyzing agent and splitting by the use of thiophenolate are the most preferable dephenylacetylation processes.

The above reaction is such that, of the two acyl groups, i.e. phenylacetyl and isoxazolyl groups, which have been bonded to the nitrogen atom in the 6-position of penicillanic acid of the diacyl penicillin ester V, only the former is entirely selectively cleaved.

In the most preferable reaction mentioned above, a primary organic amine, a secondary organic amine, ammonia, primary aliphatic amine or the like is used as the aminolyzing agent. In this reaction, only the bond on the side of phenylacetyl group is cleaved, because the bond on the side of isoxazolyl group is stable, and an N-substituted phenylacetamide is formed as byproduct. This reaction sometimes brings about, depending on the kind of aminolyzing agent, the epimerization of the hydrogen atom in the 6-position of the penicillin nucleus, or the cleavage of β-lactam bond of the penicillin nucleus, simultaneously with the aminolysis. However, preferable aminolysis conditions can be ensured by the selection of suitable aminolyzing agent, reaction solvent and the like.

In the above reaction, the solvent is desirably so selected that it will not have any detrimental effect, such as epimerization or decomposition of the β-lactam ring, on the reaction; that it will be able to solubilize the isoxazolyl penicillin ester VI; and that it will be an organic solvent immiscible with water because, after the reaction, unreacted aminolyzing agent, e.g. a primary organic amine, is removed by washing. For example, benzene, toluene, chloroform, dichloromethane, dichloroethane, ethyl acetate, butyl acetate, ethyl ether or isopropyl ether may be advantageously used.

As the aminolyzing agent, it is advantageous to use a primary organic amine, e.g. a cylcoalkylamine such as cyclohexylamine, benzylamine, a phenylaklyamine such as β-phenylethylamine, or a primary aliphatic amine such as ethylamine, n-butylamine, n-propylamine, n-pentylamine, n-hexylamine, n-heptylamine, n-octylamine, caprylamine, laurylamine, myristylamine, palmitylamine, stearylamine or the like. In the last case, the greater the number of carbon atoms, the less the danger of epimerization and the less the decomposition of isoxazolyl penicillin ester VI. Accordingly, an amine having four to 20 carbon atoms is preferably used and a straight chain aliphatic amine is advantageously used. In the case of branched chain aliphatic amines, it is better not to have a side chain at the α-position of the carbon chain. Among these amines, straight chain higher aliphatic amine having more than 12 carbon atoms such as laurylamine, myristylamine, palmitylamine, stearylamine or the like are the most advantageously used. Theoretically, the quantitative proportion of the aminolyzing agent may be equimolar to the diacyl penicillin ester V. However, the aminolyzing agent is more easily removed than unreacted diacyl penicillin ester V and hence is ordinarily used in an amount of one to two times the moles of the diacyl penicillin ester V.

The above-mentioned reaction progresses even at low temperatures and therefore no heating is necessary unless the reaction of the diacyl penicillin ester V with a primary organic amine is undesirably slow. In case a secondary organic amine is used, however, the reaction is slow and therefore it is sometimes necessary to heat the reaction mixture.

The dephenylacetylation reaction by solvolysis may be effected by use of a lower aliphatic alcohol, e.g. methanol or ethanol, or a hydrated lower aliphatic alcohol, e.g. hydrated methanol or hydrated ethanol.

The dephenylacetylation reaction by hydrolysis may be carried out by treatment with an acid or an alkali in a hydrophilic organic solvent capable of dissolving the diacyl penicillin ester V such as, for example, dimethylformamide, acetone, dioxane or tetrahydrofuran.

According to the above-mentioned reaction, the isoxazolyl penicillin ester VI is obtained. In separating this reaction product, the reaction liquid is washed with a dilute acid and water, in that order, whereby unreacted aminolyzing agent, e.g. a primary organic amine, can be removed from the reaction liquid as a water-soluble acid addition salt to isolate the product.

When a primary aliphatic amine is used as an aminolyzing agent, there will be present isoxazolyl penicillin ester VI, by-product aliphatic group-substituted phenylacetamide, and unreacted primary aliphatic amine. When eliminating isoxazolyl penicillin ester VI therefrom, if primary aliphatic amine is formed as a water soluble acid addition salt such as lower aliphatic amine, the reaction mixture should be washed with dilute acid and water respectively to remove primary aliphatic amine which forms a water soluble acid addition salt.

The said reaction mixture is charged to a column of silica gel or alumina and then eluted with a suitable solvent such as benzene-chloroform or benzene-ethylacetate to separate isoxazolyl penicillin ester VI readily therefrom.

The isoxazolyl penicillin ester VI may be isolated, if necessary; however, it is not necessary to separate it from the reaction mixture, and the condensate or lyophilizate thereof may be used in a subsequent reaction, e.g. removal of the protective group of isoxazolyl penicillin ester VI.

In the next step, the protective group for the isoxazolyl penicillin ester VI is eliminated to obtain an isoxazolyl penicillin represented by Formula I (hereinafter said penicillin will be referred to as "the isoxazolyl penicillin I"). In the present invention, however, when R' in Formula V is a lower alkyl group, the aforesaid elimination reaction results in the destruction of the structure of the penicillin, and therefore the isoxazolyl penicillin ester VI may be regarded as the final product without eliminating the protective group. When R' in Formula V is a group which can be easily eliminated without having any detrimental effect on the structure of penicillin, said group can be eliminated by a known process. That is, a benzyl, p-nitrobenzyl or benzhydril group can be eliminated by catalytic reduction, and a phenacyl or p-bromophenacyl group can be eliminated by using sodium thiophenoxide, or thiophenolate. In this elimination reaction, if thiophenolate is used in more than two-molar excess with diacyl penicillin V, dephenylacetylation and deesterification occur simultaneously to produce the isoxazolyl penicillin free acid of Formula I.

The catalytic reduction is effected by use of hydrogen gas in an inert organic solvent, e.g. ethyl acetate, butyl acetate, chloroform, dichloromethane, benzene, toluene or ethyl ether, in the presence of a palladium-active carbon catalyst or the like. In this case, no superatmospheric pressure is required. The reaction progresses more quickly in the case of the p-nitrobenzyl group than in the case of the benzyl group, and the former group is easily eliminated.

The isoxazolyl penicillin I obtained according to the above-mentioned reduction reaction exists, in the reaction liquid, in the form of a free acid. This isoxazolyl penicillin I can be isolated from the reaction liquid as a pharmacologically nontoxic salt according to known processes employed in the case of penicillin G or V. For example, the reaction liquid may be neutralized with an n-butanol or butyl acetate solution of potassium or sodium 2-ethylhexanoate to convert the penicillin to a solvent-insoluble salt, followed by recovery. Alternatively, the reaction liquid is washed with an acid and water, in this order, is neutrally extracted with an aqueous potassium or sodium hydroxide solution and is subjected to freeze-drying, and the penicillin is directly recovered in the form of a potassium or sodium salt or is precipitated as a water-insoluble salt with an amine such as N,N'-dibenzylethylenediamine and is then recovered.

In the next step, the elimination of the phenacyl or p-bromophenacyl group by means of sodium thiophenoxide is carried out according to the process of Sheehan et al., J. Org. Chem., 29 2006–8 (1964). When treated with sodium thiophenoxide in a suitable inert organic solvent such as, for example, dimethylformamide, tetrahydrofuran or dioxane, said group is easily eliminated and, moreover, the isoxazolyl penicillin I is obtained as a sodium salt. Accordingly, when a solvent such as acetone is added to the reaction liquid after completion of the reaction, the sodium salt of isoxazolyl penicillin I can be precipitated and the isoxazolyl penicillin I can be isolated with extreme ease. An isoxazolyl penicillin of Formula I in which R is a lower alkyl group, i.e. an isoxazolyl penicillin ester of Formula VI in which R' is a lower alkyl group, is in the form of a lower alkyl ester and hence does not form any nontoxic salt.

In the present invention, in accordance with the reaction between thiophenolate and diacyl penicillin V, of the two acyl groups, i.e. phenylacetyl and isoxazolyl groups, which have been bonded to the nitrogen atom in the 6-position of penicillanic acid, only the former is entirely selectively cleaved to produce isoxazolyl penicillin ester VI. Further, in case of the reaction with more than two-molar excess of thiophenolate, of the two acyl groups, i.e. phenylacetyl and isoxazolyl groups which have been bonded to the nitrogen atom in the 6-position of penicillanic acid, only the former is selectively split, and the protective group of a carboxyl group is simultaneously removed therefrom.

Thiophenolate used in the above-described reaction is a compound having the formula

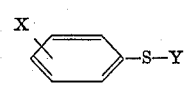

wherein X is hydrogen or a halogen atom and Y is a metal atom, the compound being sodium thiophenolate, sodium p-chlorothiophenolate, potassium thiophenorate, potassium p-chlorothiophenorate or the like.

The isoxazolyl penicillins I obtained according to the present process, e.g. 3-phenyl-5-methyl-4-isoxazolyl penicillin and 3-(2'-chlorophenyl)-5-methyl-4-isoxazolyl penicillin, are known penicillins. However, they are not only excellent in antibacterial activity and stable in acids but also resist destruction due to penicillinase and hence are effective against resistant bacteria. Accordingly, they have been used for clinical purposes and are extremely important compounds as antibacterial medicines.

As is clear from the above, the present process, in which the isoxazolyl penicillins I are prepared according to chemical reactions only, without using 6-aminopenicillanic acid but using penicillin G obtained by fermentation, is entirely novel and extremely useful as a process for preparing the isoxazolyl penicillins I.

The present process will be illustrated in detail below with reference to particular examples, but the various reaction operations and compounds which may be employed in the present process are not limited to those shown in the examples.

EXAMPLE 1

Preparation of benzylpenicillin-p-nitrobenzyl ester:

A mixture comprising 74.5 g. (0.2 mole) of potassium penicillin G obtained by fermentation and 39.0 g. (0.18 mole) of p-nitrobenzyl bromide was added to 500 ml. of dimethylformamide, and the reaction liquid was stirred while maintaining the temperature thereof at 65° C. The progress of the reaction was traced by the iodine method on a silica gel, thin layer-chromatogram, and the disappearance of p-nitrobenzyl bromide was regarded as the end point of the reaction. After 4 hours, the reaction was substantially complete.

After cooling, the reaction liquid was charged with 300 ml. of benzene and was washed several times with water, a 10 percent aqueous sodium carbonate solution, and water, in this order, to remove the reaction solvent and unreacted potassium penicillin G, whereby a benzene solution was obtained. This solution was dried with anhydrous sodium sulfate and was then freeze-dried to obtain 63.6 g. of benzylpenicillin-p-nitrobenzyl ester, yield 67.7 percent.

The silica gel, thin layer chromatogram of the above-mentioned freeze-dried product was obtained with a developing solvent: benzene-ethyl acetate (10:1).

Elementary analysis for $C_{23}H_{23}O_6N_3S$:

|  | C % | H % | N % |
|---|---|---|---|
| Found | 58.93 | 4.87 | 8.90 |
| Calculated | 58.84 | 4.95 | 8.94 |

EXAMPLE 2

Preparation of benzylpenicillin-p-bromophenacyl ester:

Example 1 was repeated, except that p-bromophenacyl bromide was used in place of the p-nitrobenzyl bromide, to obtain benzylpenicillin-p-bromophenacyl ester.

Elementary analysis for $C_{24}H_{23}O_4N_2SBr$:

|  | C % | H % | N % | Br % |
|---|---|---|---|---|
| Found | 54.62 | 4.69 | 5.49 | 16.01 |
| Calculated | 54.25 | 4.36 | 5.27 | 15.04 |

EXAMPLE 3

Preparation of N-(3-phenyl-5-methyl isoxazole-4-carbonyl)-benzylpenicillin-p-nitrobenzyl ester:

23.3 g. (0.05 mole) of the benzylpenicillin-p-nitrobenzyl ester of Example 1 was dissolved in 100 ml. of dry benzene. To this solution was added 16.2 ml. (0.2 mole) of dry pyridine with cooling to 0° C. and stirring. Thereafter, a solution of 10.9 g. (0.0525 mole) of $PCl_5$ in 200 ml. of dry benzene was added dropwise over a period of 30 minutes. Subsequently, the liquid was reacted for 1.5 hours while maintaining the temperature thereof at 0° C.

After the reaction, deposited pyridine hydrochloride was removed by filtration, and the reaction mother liquor was quickly washed four times with a 1-N aqueous sodium bicarbonate solution and twice with water to remove unreacted $PCl_3$ and byproduct $POCl_3$. The above-mentioned benzene solution was dried with ice-cooling with anhydrous sodium sulfate, was then immediately charged with 16.9 g. (0.075 mole) of sodium 3-phenyl-5-methyl-isoxazol-4-carboxylate, and was stirred at room temperature. The progress of the reaction was determined according to the hydroxamic acid method on a silica gel, thin layer chromatogram, and the reaction was substantially complete after 20 hours.

The reaction liquid was washed with 0.5-N hydrochloric acid, a 1-N aqueous sodium bicarbonate solution, an aqueous saturated sodium chloride solution, and water, in this order, to remove unreacted 3-phenyl-5-methyl-isoxazol-4-carboxylic acid, and the reaction mother liquor was dried with anhydrous sodium sulfate and was then concentrated under reduced pressure. Subsequently, the concentrate was adsorbed on a column comprising silica gel (60–80 mesh; produced by Kanto Kagaku K.K., Tokyo) and was eluted with anhydrous benzene-ethyl acetate (10:1), whereby the first eluted fraction contained a desired N-(3-phenyl-5-methyl-isoxazole-4-carbonyl)-benzylpenicillin-p-nitrobenzyl ester. This fraction was recovered and was freeze-dried to obtain 7.51 g. of a freeze-dried product, yield 57.3 percent, $[\alpha]_D^{23}$ 194 ($\sigma = 1$, $CHCl_3$).

Elementary analysis for $C_{34}H_{30}O_8N_4S$:

|  | C % | H % | N % |
|---|---|---|---|
| Found | 62.49 | 4.57 | 8.76 |
| Calculated | 62.38 | 4.62 | 8.56 |

EXAMPLE 4

Preparation of N-[3-(2'-chlorophenyl)-5-methyl-isoxazole-4-carbonyl]-benzylpenicillin-p-nitrobenzyl ester:

Example 3 was repeated, except that sodium 3-(2'-chlorophenyl)-5-methyl-isoxazol-4-carboxylate was used in place of the sodium 3-phenyl-5-methyl-isoxazol-4-carboxylate, to obtain N-[3-(2'-chlorophenyl)-5-methyl-isoxazole-4-carbonyl]-benzylpenicillin-p-nitrobenzyl ester, yield 51.6 percent.

Elementary analysis for $C_{34}H_{29}O_8N_4SCl$:

|  | C % | H % | N % |
|---|---|---|---|
| Found | 59.43 | 4.32 | 8.00 |
| Calculated | 59.26 | 4.24 | 8.13 |

EXAMPLE 5

Preparation of N-(3-phenyl-5-methyl-isoxazole-4-carbonyl)-benzylpenicillin-p-bromophenacyl ester:

Example 3 was repeated, except that the benzylpenicillin-p-bromo-phenacyl ester obtained in Example 2 was used in place of the benzylpenicillin-p-nitrobenzyl ester, to obtain N-(3-phenyl-5-methyl-isoxazole-4-carbonyl)-benzylpenicillin-p-bromophenacyl ester, yield 52.3 percent.

Elementary analysis for $C_{35}H_{30}O_7N_3SBr$:

|  | C % | H % | N % | Br % |
|---|---|---|---|---|
| Found | 58.47 | 4.29 | 5.95 | 11.00 |
| Calculated | 58.66 | 4.22 | 5.86 | 11.15 |

EXAMPLE 6

Preparation of N-[3-(2'-chlorophenyl)-5-methyl-isoxazole-4-carbonyl]-benzylpenicillin-p-bromophenacyl ester:

Example 3 was repeated, except that the benzylpenicillin-p-bromophenacyl ester obtained in Example 2 was used in place of the benzylpenicillin-p-nitrobenzyl ester and sodium 3-(2'-chlorophenyl)-5-methyl-4-isoxazol carboxylate in place of the sodium 3-phenyl-5-methyl-isoxazol-4-carboxylate, to obtain N-[3-(2'-chlorophenyl)-5-methyl-isoxazole-4-carbonyl]-benzylpenicillin-p-bromophenacyl ester, yield 46.5 percent.

Elementary analysis for $C_{35}H_{29}O_7N_3SClBr$:

| | C % | H % | N % |
|---|---|---|---|
| Found | 55.62 | 3.98 | 5.43 |
| Calculated | 55.97 | 3.89 | 5.59 |

EXAMPLE 7

Preparation of N-(3-phenyl-5methyl-isoxazole-4-carbonyl)-benzylpenicillin-methyl ester:

Example 3 was repeated, except that benzylpenicillinmethyl ester was used in place of the benzylpenicillin-p-nitro-benzyl ester, to obtain N-(3-phenyl-5-methyl-isoxazole-4carbonyl)-benzylpenicillin-methyl ester, yield 67.1 percent.

Elementary analysis for $C_{28}H_{27}O_6N_3S$:

| | C % | H % | N % |
|---|---|---|---|
| Found | 62.88 | 5.11 | 7.79 |
| Calculated | 63.02 | 5.10 | 7.87 |

The benzylpenicillin-methyl ester employed in the above reaction had been prepared according to a known process in which potassium penicillin G obtained by fermentation was treated with diazomethane.

EXAMPLE 8

Preparation of N-[3-(2'-chlorophenyl)-5-methyl-isoxazole-4-carbonyl]-benzylpenicillin-methyl ester:

Example 3 was repeated, except that benzylpenicillin-methyl ester was used in place of the benzylpenicillin-p-nitrobenzyl ester and sodium 3-(2'-chlorophenyl)-5-methyl-isoxazol-carboxylate in place of the sodium 3-phenyl-5-methyl-isoxazol-carboxylate, to obtain N-[3-(2'-chlorophenyl)-5-methyl-isoxazole-4-carbonyl]-benzylpenicillin-methyl ester, yield 58.8 percent.

Elementary analysis for $C_{28}H_{26}O_6N_3SCl$:

| | C % | H % | N % | Cl % |
|---|---|---|---|---|
| Found | 59.33 | 4.63 | 7.45 | 6.23 |
| Calculated | 59.20 | 4.61 | 7.40 | 6.24 |

The benxylpenicillin-methyl ester employed in the above reaction had been prepared according to a known process in which potassium penicillin G obtained by fermentation was treated with diazomethane.

EXAMPLE 9

Preparation of 3-phenyl-5-methyl-4-isoxazolyl penicillin-p-nitrobenzyl ester:

12.5 g. (0.02 mole) of the N-(3-phenyl-5-methyl-isoxazole-4-carbonyl)-benzylpenicillin-p-nitrobenzyl ester was dissolved in 100 ml. of dry benzene. To this solution was added dropwise 4.84 ml. (0.04 mole) of cyclohexylamine, with stirring, at room temperature. The progress of the reaction was determined according to the hydroxamic method on a silica gel, thin layer chromatogram, and the reaction was substantially complete after 3 hours. According to the above reaction, the phenylacetyl group was cleaved and N-cyclohexyl-phenylacetamide was present as by-product.

The reaction liquid was washed with 0.5–N hydrochloric acid and water, in this order, to remove unreacted cyclohexylamine as a water-soluble hydrochloride. The reaction mother liquor was dried with anhydrous sodium sulfate and was then concentrated under reduced pressure to obtain an oily substance (about 22.8 g.). To this oily substance was further added dry benzene, and an insoluble precipitate was removed by filtration using Celite. The filtrate was again concentrated, and the concentrate was adsorbed on a column comprising 200 g. of silica gel (60–80 mesh) and was subjected to column chromatography using benzene-ethyl acetate (5:1) as a developing solvent. Eluted fractions were traced according to the hydroxamic acid method on a silica gel, thin layer chromatogram, and only the fractions containing 3-phenyl-5-methyl-4-isoxazolyl-penicillin-p-nitrobenzyl ester were recovered and were freeze-dried to obtain 7.56 g. of a freeze-dried product, yield 70.4 percent.

Elementary analysis for $C_{26}H_{24}O_7N_4S$:

| | C % | H % | N % |
|---|---|---|---|
| Found | 57.98 | 4.58 | 10.52 |
| Calculated | 58.19 | 4.51 | 10.44 |

Furthermore, 726 mg. of N-(3-phenyl-5-methyl-isoxazole-4-carbonyl)-benzylpenicillin-p-nitrobenzyl ester was recovered.

EXAMPLE 10

Preparation of 3-(2'-chlorophenyl)-5-methyl-4-isoxazolyl-penicillin-p-nitrobenzyl ester:

13.1 g. (0.02 mole) of the N-[3-(2'-chlorophenyl)-5-methyl-isoxazole-4-carbonyl]-benzylpenicillin-p-nitrobenzyl ester was dissolved in 100 ml. of dry benzene. To this solution was added dropwise 4.84 ml. (0.04 mole) of cyclohexylamine, with stirring at room temperature. The progress of the reaction was determined according to the hydroxamic acid method on a silica gel, thin layer chromatogram, and the reaction was substantially complete after three hours. By the above reaction, the phenylacetyl group was cleaved and N-cyclohexyl-phenylacetamide was present as by-product.

The reaction liquid was washed with 0.5-N hydrochloric acid and water, in that order, to remove unreacted cyclohexylamine as a water-soluble hydrochloride. The reaction mother liquor was dried with anhydrous sodium sulfate and was then concentrated under reduced pressure to obtain an oily substance. This oily substance was adsorbed on a column comprising 200 g. of silica gel (60–80 mesh) and was subjected to column chromatography using benzene-ethyl acetate (5:1) as a developing solvent. Eluted fractions were traced according to the hydroxamic acid method on a silica gel, thin layer chromatogram, and only the fractions containing [3-(2'-chlorophenyl)-5-methyl-4-isoxazolyl]-penicillin-p-nitrobenzyl ester were recovered and were freeze-dried to obtain 7.50 g. of a freeze-dried product, yield 66.6 percent.

Elementary analysis for $C_{26}H_{23}O_7N_4SCl$:

| | C % | H % | N % | Cl % |
|---|---|---|---|---|
| Found | 54.45 | 4.13 | 9.67 | 6.45 |
| Calculated | 54.69 | 4.06 | 9.81 | 6.21 |

EXAMPLE 11

Preparation of 3-phenyl-5-methyl-4-isoxazolyl-penicillin-p-nitrobenzyl ester:

Example 9 was repeated, except that benzylamine was used in place of the cyclohexylamine, to obtain 3-phenyl-5-methyl-4-isoxazolyl-penicillin-p-nitrobenzyl ester, yield 65.8 percent.

Elementary analysis for $C_{26}H_{24}O_7N_4S$:

| | C % | H % | N % |
|---|---|---|---|
| Found | 57.99 | 4.53 | 10.51 |
| Calculated | 58.19 | 4.51 | 10.44 |

EXAMPLE 12

Preparation of 3-(2'-chlorophenyl)-5-methyl-isoxazolyl-penicillin-p-nitrobenzyl ester:

Example 9 was repeated, except that benzylamine was used in place of the cyclohexylamine, to obtain 3-(2'-chloro-phenyl)-5-methyl-4-isoxazolyl-penicillin-p-nitrobenzyl ester, yield 68.4 percent.

Elementary analysis for $C_{26}H_{23}O_7N_4SCl$:

| | C % | H % | N % | Cl % |
|---|---|---|---|---|
| Found | 54.32 | 4.07 | 9.72 | 6.30 |
| Calculated | 54.69 | 4.06 | 9.81 | 6.21 |

EXAMPLE 13

Preparation of 3-phenyl-5-methyl-4-isoxazolyl-penicillin-p-bromophenacyl ester:

Example 9 was repeated, except that the N-(3-phenyl-5-methyl-isoxazole-4-carbonyl)-benzylpenicillin-p-bromophenacyl ester obtained in Example 5 was used in place of the N-(3-phenyl-5-methyl-isoxazole-4-carbonyl)-benzylpenicillin-p-nitrobenzyl ester, to obtain 3-phenyl-5-methyl-4-isoxazolyl-penicillin-p-bromophenacyl ester, yield 65.8 percent.

Elementary analysis for $C_{27}H_{24}O_6N_3SBr$:

| | C % | H % | N % | Br % |
|---|---|---|---|---|
| Found | 54.92 | 4.28 | 6.92 | 13.44 |
| Calculated | 54.19 | 4.04 | 7.02 | 13.35 |

EXAMPLE 14

Preparation of 3-(2'-chlorophenyl)-5-methyl-isoxazolyl-penicillin-p-bromophenacyl ester:

Example 10 was repeated, except that the N-[3-(2'-chlorophenyl)- 5-methyl-isoxazole-4-carbonyl]-benzylpenicillin-p-bromophenacyl ester obtained in Example 6 was used in place of the N-[3-(2'-chlorophenyl)-5-methyl-isoxazole-4-carbonyl]-benzyl-penicillin-p-nitrobenzyl ester, to obtain 3-(2'-chlorophenyl)-5-methyl-4-isoxazolyl-penicillin-p-bromophenacyl ester.

Elementary analysis for $C_{27}H_{23}O_6N_3SClBr$:

| | C % | H % | N % |
|---|---|---|---|
| Found | 51.92 | 3.64 | 6.87 |
| Calculated | 51.24 | 3.66 | 6.64 |

EXAMPLE 15

Preparation of 3-phenyl-5-methyl-4-isoxazolyl-penicillin-methyl ester;

Example 9 was repeated, except that the N-(3-phenyl-5-methyl-isoxazole-4-carbonyl)-benzylpenicillin-methyl ester obtained in Example 7 was used in place of the N-(3-phenyl-5-methyl-isoxazole-4-carbonyl)-benzylpenicillin-p-nitrobenzyl ester, to obtain 3-phenyl-5-methyl-4-isoxazolyl-penicillin-methyl ester, yield 74.5 percent.

Elementary analysis for $C_{20}H_{21}O_5N_3S$:

| | C % | H % | N % |
|---|---|---|---|
| Found | 58.00 | 5.21 | 10.13 |
| Calculated | 57.82 | 5.09 | 10.11 |

EXAMPLE 16

Preparation of 3-(2'-chlorophenyl)-5-methyl-4-isoxazolyl-penicillin-methyl ester:

Example 10 was repeated, except that the N-[3-(2'-chlorophenyl)-5-methyl-isoxazole-4-carbonyl]-benzylpenicillin-methyl ester obtained in Example 8 was used in place of the N-[3-(2'-chlorophenyl)-5-methyl-isoxazole-4-carbonyl]-benzylpenicillin-p-nitrophenyl ester, to obtain 3-(2'-chlorophenyl)-5-methyl-4-isoxazolyl-penicillin-methyl ester, yield 68.7 percent.

Elementary analysis for $C_{20}H_{20}O_5N_3SCl$:

| | C % | H % | N % | Cl % |
|---|---|---|---|---|
| Found | 53.31 | 4.55 | 9.42 | 8.02 |
| Calculated | 53.39 | 4.48 | 9.34 | 7.88 |

EXAMPLE 17

Preparation of 3-phenyl-5-methyl-iosxazolyl-penicillin N,N'-dibenzylethylenediamine salt:

2.68 g. (5 mmol.) of the 3-phenyl-5-methyl-4-isoxazolyl-penicillin-p-nitrobenzyl ester obtained in Example 9 was dissolved in 30 ml. of dry ethyl acetate. To this solution 1.40 ml. (10 mmol.) of triethylamine was added and then the mixture was subjected to hydrogenation at normal temperature and pressure in the presence of 3 g. of a 5 percent palladium-active carbon catalyst. The progress of the reaction was determined according to the hydroxamic acid method on a silica gel, thin layer chromatogram, and the reaction was substantially complete after one hour.

The reaction mixture was freed from the catalyst by filtration, and the reaction mother liquor was extracted several times with 30 ml. of water. To this water extract (pH 6.8) was added an aqueous solution of N,N'-dibenzyl-ethylenediamine diacetate to form a water-insoluble salt. The precipitated salt was recovered by filtration, was washed with water and was then thoroughly dried to obtain 2.56 g. of a powder of 3-phenyl-5-methyl-4-isoxazolyl penicillin N,N'-dibenzyl-ethylenediamine salt, yield 49.0 percent.

The titer of the thus obtained product was substantially identical with that of a salt of N,N'-dibenzyl-ethylenediamine formed from a commercially available oxacillin. According to biological assay, the product had a purity of 94 percent.

Elementary analysis for $(C_{19}H_{19}O_5N_3S)_2 \cdot C_{16}H_{20}N_2$:

| | C % | H % | N % |
|---|---|---|---|
| Found | 62.53 | 5.67 | 10.70 |
| Calculated | 62.17 | 5.60 | 10.74 |

Thus, the 3-phenyl-5-methyl-4-isoxazolyl penicillin prepared according to the present process coincides both physically and biologically with that prepared according to the conventional process.

EXAMPLE 18

Preparation of 3-phenyl-5-methyl-4-isoxazolyl-penicillin sodium:

2.82 g. (5 mmol.) of the 3-phenyl-5-methyl-4-isoxazolyl-penicillin-p-bromophenyl ester was dissolved in 25 ml. of dimethylformamide. To this solution was added 1.32 g. (10 mmol.) of sodium thiophenoxide, and the mixture was reacted at room temperature for 20 minutes.

Subsequently, the reaction mixture was charged with 500 ml. of acetone and was stirred, and the precipitate was recovered by filtration, was washed with acetone and was then dried to obtain 1.42 g. of sodium 3-phenyl-5-methyl-4-isoxazolyl-penicillin, yield 67.1 percent.

The titer of the thus-obtained product coincided with that of a commercially available sodium oxacillin. According to biological assay, this product had a purity of 95 percent.

Elementary analysis for $C_{19}H_{18}O_5N_3SNa$:

| | C % | H % | N % |
|---|---|---|---|
| Found | 54.33 | 4.34 | 9.75 |
| Calculated | 54.89 | 4.28 | 9.92 |

EXAMPLE 19

Preparation of 3-(2'-chlorophenyl)-5-methyl-4-isoxazolyl-penicillin N,N'-dibenzyl-ethylenediamine salt:

2.86 g. (5 mmol.) of the 3-(2'-chlorophenyl)-5-methyl-4-isoxazolyl-penicillin-p-nitrobenzyl ester was dissolved in 30 ml. of dry ethyl acetate. To this solution was added 1.40 ml. (10 mmol.) of triethylamine, and the mixture was subjected to hydrogenation at normal temperature and pressure in the presence of 3 g. of a 5 percent palladium-active carbon catalyst. The progress of the reaction was determined according to the hydroxamic acid method on a silica gel, thin layer chromatogram, and the reaction was substantially complete after 1 hour.

The reaction mixture was freed from the catalyst by filtration, and the reaction mother liquor was extracted several times with 30 ml. of water. To this extract (pH 6.8) was added an aqueous solution of N,N'-dibenzyl ethylenediamine diacetate to form a water-insoluble salt. The precipitated salt was recovered by filtration, was washed with water and was then thoroughly dried to obtain 2.48 g. of 3-(2'-chlorophenyl)-5-methyl-4-isoxazolyl-penicillin N,N'-dibenzyl-ethylenediamine salt, yield 44.6 percent. According to biological assay, the product had a purity of 92.5 percent.

Elementary analysis for $(C_{19}H_{18}O_5N_3SCl)_2 C_{16}H_{20}N_2$:

| | C % | H % | N % | Cl % |
|---|---|---|---|---|
| Found | 58.44 | 5.15 | 10.01 | 6.22 |
| Calculated | 58.32 | 5.08 | 10.08 | 6.38 |

Thus, the 3-(2'-chlorophenyl)-5-methyl-4-isoxazolyl-penicillin prepared according to the present process coincides both physically and biologically with that prepared according to the conventional process.

EXAMPLE 20

Preparation of sodium 3-(2'-chlorophenyl)-5-methyl-4-isoxazolyl-penicillin:

2.99 g. (5 mmol.) of the 3-(2'-chlorophenyl)-5-methyl-4-isoxazolyl-penicillin;p-bromophenacyl ester obtained in Example 14 was dissolved in 25 ml. dimethylformamide. To this solution was added 1.32 g. (10 mmol.) of sodium thiophenoxide, and the mixture was reacted at room temperature for 20 minutes.

Subsequently, the mixture was charged with 500 ml. of acetone and was stirred, and a precipitate was recovered by filtration, was washed with acetone and was then dried to obtain 1.37 g. of sodium 3-(2'-chlorophenyl)-5-methyl-4-isoxazolyl-penicillin, yield 60.0 percent. According to biological assay, the product had a purity of 94 percent.

Elementary analysis for $C_{19}H_{17}O_5N_3SClNa$:

|  | C% | H% | N% | Cl% |
|---|---|---|---|---|
| Found | 53.08 | 4.20 | 9.79 | 8.23 |
| Calculated | 53.59 | 4.02 | 9.87 | 8.33 |

The thus-obtained product coincided both physically and biologically with that prepared according to the conventional process.

EXAMPLE 21

Preparation of 3-phenyl-5-methyl-4-isoxazolyl-penicillin sodium salt:

35.84 g. (0.05 mole) of the N-(3-phenyl-5-methyl-4-isoxazolyl)-benzyl-penicillin-p-bromophenacyl ester was dissolved in 100 ml. of dry chloroform. To this solution was added 7.39 ml. (0.075 mole) of n-butylamine at room temperature with stirring. The reaction progress was followed according to the hydroxamic acid method on a silica gel, thin layer chromatogram, and the reaction was substantially complete after three hours.

The phenylacetyl group was split to produce N-N-butylphonylacetamide as a byproduct in accordance with the above-described reaction.

The reaction mixture hereinabove was washed with 0.5 N–HCl and water respectively to remove unreacted n-butylamine as a hydrochloride. After drying the reaction mixture with anhydrous sodium sulfate, the said mother liquor was concentrated in vacuo. The yielded oily substance was dissolved in dry benzene, and charged on a column of silica gel (500 g., 60–80 mesh), then eluted with benzene-ethylacetate (5:11). The eluate, containing 3-phenyl-5-methyl-4-isoxazolyl penicillin-p-bromophenacyl ester, which was detected by the hydroxamic acid method on a silica gel thin layer chromatogram, was collected and concentrated in vacuo to obtain a condensate.

The said condensate was dissolved in 75 ml. of dimethylformamide, slowly adding 6.6 g. (0.05 mole) of sodium thiophenoxide thereafter and reacting for 1 hour. After the reaction was complete, 600 ml. of methyl isobutyl ketone was added thereto, and washed with 0.5N HCl and water in that order. 3-phenyl-5-methyl-4-isoxazolyl penicillin, which was contained in the methyl isobutyl ketone layer, was repeatedly extracted with small amounts of sodium bicarbonate solution. The extract was lyophilized to obtain 3-phenyl-5-methyl-4-isoxazolyl penicillin sodium salt. Yield: 10.1 g. (recovery: 51.5 percent).

Elementary analysis for $C_{19}H_{18}O_5N_3SNa$:

|  | C% | H% | N% |
|---|---|---|---|
| Found | 54.89 | 4.28 | 9.92 |
| Calculated | 55.14 | 4.12 | 9.77 |

Purity: 81% by bioassay

EXAMPLE 22

Preparation of sodium 3-phenyl-5-methyl-4-isoxazolyl penicillin:

35.84 g. (0.05 mole) of N-(3-phenyl-5-methyl-isoxazole-4-carbonyl)-benzylpenicillin-p-bromophenacyl ester was dissolved in 50 ml. of dry chloroform. To the solution 12 g. (0.065 mole) of laurylamine in 50 ml. of dry chloroform was dropwise added with stirring for 7 hours. The reaction was continued for an additional hour. 100 ml. of dry benzene and 15 g. of silica gel were added thereto. After stirring for 40 hours, the solution was filtered and the filtrate was concentrated in vacuo to remove chloroform. The concentrate was charged on a 50 g. of silica gel column in benzene (60–80 mesh) and eluted with benzene-ethylacetate (10:1) to elute 3-phenyl-5-methyl-4-isoxazolyl penicillin-p-bromophenacyl ester, which was concentrated in vacuo to obtain a condensate. Sodium thiophenoxide was reacted with the said condensate to remove the ester by the same procedure as in Example 21. 3-phenyl-5-methyl-4-isoxazolyl penicillin sodium salt was yielded as a lyophilizate.

Yield: 9.8 g. (recovery: 50.1 percent)
Purity: 92 percent by bioassay

EXAMPLE 23

Preparation of 3-phenyl-5-methyl-4-isoxazolyl penicillin sodium salt:

35.84 g. (0.05 mole) of N-(3-phenyl-5-methyl-isoxazole-4-carbonyl)-benzylpenicillin-p-bromophenacyl ester was dissolved in 100 ml. of dry chloroform. To this solution 19.25 g. (0.075 mole) of stearylamine in 80 ml. of dry chloroform was dropwise added with stirring at 0° C.

After 3 hours of reaction, the reaction mixture was charged on a column of 1 kg. of silica gel (60–80 mesh) in chloroform and was eluted with benzene-chloroform (1:1).

The elute was analyzed according to the hydroxamic acid method on a silica gel, thin layer chromatogram, and a fraction containing 3-phenyl-5-methyl-4-isoxazolyl penicillin-p-bromophenacyl ester therein was collected, and then concentrated in vacuo to obtain a concentrate.

De-esterification was achieved according to Example 21 by sodium thiophenoxide to yield 3-phenyl-5-methyl-4-isoxazolyl penicillin sodium salt as a lyophilizate.

Yield: 10.0 g. (recovery 51.1 percent)
Purity: 95 percent by bioassay

EXAMPLE 24

Preparation of 3-(2'-chlorophenyl)-5-methyl-4-isoxazolyl penicillin sodium salt:

In Example 21, N-(3-phenyl-5-methyl-isoxazole-4-carbonyl)-benzylpenicillin-p-bromophenacyl ester was replaced by N-[3-(2'-chlorophenyl)-5methyl-isoxazole-4-carbonyl]-benzylpenicillin-p-bromophenacyl ester obtained in Example 6. 3-(2'-chlorophenyl)-5-methyl-4-isoxazolyl penicillin sodium salt was yielded.

Yield: 47.8 percent
Purity: 78.5 percent by bioassay

EXAMPLE 25

Preparation of 3-(2'-chlorophenyl)-5-methyl-4-isoxazolyl penicillin sodium salt.

In Example 22, N-(3-phenyl-5-methyl-isoxazole-4-carbonyl)-benzylpenicillin-p-bromophenacyl ester was replaced by N-[3-(2'-chlorophenyl)-5-methyl-isoxazole-4-carbonyl]-benzylpenicillin-p-bromophenacyl ester to produce 3-(2'-chlorophenyl)-5-methyl-4-isoxazolyl penicillin sodium salt.

Yield: 45.4 percent
Purity: 91.5 percent by bioassay

EXAMPLE 26

Preparation of 3-(2'-chlorophenyl)-5-methyl-4-isoxazolyl penicillin sodium salt: charged 37.55 g. (0.05 mole) of N-[3-(2'-chlorophenyl)-5-methyl-isoxazole-4-carbonyl]-benzylpenicillin-p-bromophenacyl ester obtained in Example 6 was dissolved in 40 ml. of dry chloroform. To this solution 18.9 g. (0.07 mole) of stearylamine dissolved in 160 ml. of dry chloroform was dropwise added with stirring for 30 minutes and the reaction was continued for about 1.5 hours. The reaction mixture was chared on a column of silica gel (600 g., 60–80 mesh) in chloroform and was eluted with a mixed solution of benzene-chloroform (ratio 1:1). The fraction containing 3-(2'-chlorophenyl)-5-methyl-4-isoxazolyl penicillin-p-bromophenacyl ester, which was eluted after elution of by-product N-stearyl-phenylacetamide, was collected and was concentrated in vacuo to obtain a concentrate.

The de-esterfication was carried out according to the process of Example 21 to obtain 3-(2'-chlorophenyl)-5-methyl-4-isoxazolyl penicillin sodium salt as a lyophilizate.

Yield: 9.2 g. (recovery: 43.2 percent)
Purity: 92.8 percent by bioassay

EXAMPLE 27

Preparation of 3-phenyl-5-methyl-4-isoxazolyl penicillin sodium salt:

32.7 g. (0.05 mole) of N-(3-phenyl-5-methyl-isoxazole-4-carbonyl)-benzylpenicillin-p-nitrobenzyl ester obtained in Example 3 was dissolved in 100 ml. of dry chloroform. To this solution 19.25 g. (0.075 mole) of stearylamine dissolved in 80 ml. of dry chloroform was dropwise added with stirring at 0° C. After 3 hours' reaction, the reaction mixture was charged on a column of silica gel (1 kg., 60–80 mesh) in chloroform and was eluted therefrom with a mixed solution of benzene-chloroform (1:1).

The fraction containing 3-phenyl-5-methyl-4-isoxazolyl penicillin-p-nitrobenzyl ester was collected and concentrated in vacuo. The concentrate was dissolved in 180 ml. of dry ethylacetate and the solution was hydrogenized in the presence of 20 g. of 5 percent palladium-charcoal at room temperature. The progress of the reaction was followed according to the hydroxamic acid method on a silica gel thin layer chromatogram. Accordingly the reaction was completed within 1 hour.

After the reaction mixture hereinabove was filtered to remove catalyst, a mother liquor was extracted with 5 percent solution of sodium bicarbonate and phosphoric acid was added thereto until pH 2 was reached, followed by extraction with methyl isobutyl ketone. After washing the methyl isobutyl ketone layer with water, reextraction with a small amount of sodium bicarbonate solution was repeated and the thus-obtained extract was lyophilized to yield 3-phenyl-5-methyl-4-isoxazolyl penicillin sodium salt.

Yield: 6.9 g. (recovery: 35.3 percent)
Purity: 92.5 percent by bioassay

Elementary analysis for $C_{19}H_{28}O_5N_3SNa$:

|  | C % | H % | N % |
|---|---|---|---|
| Found | 55.03 | 4.23 | 9.84 |
| Calculated | 54.89 | 4.28 | 9.92 |

EXAMPLE 28

Preparation of 3-(2'-chlorophenyl)-5-methyl-4-isoxazolyl penicillin sodium salt:

35.45 g. (0.05 mole) of N-[3-(2'-chlorophenyl)-5-methyl-isoxazole-4-carbonyl]-benzylpenicillin sodium salt was dissolved in 50 ml. of dry chloroform. 18.9 g. (0.07 mole) of stearylamine dissolved in 150 ml. of dry chloroform was dropwise added at 0° C. with stirring for about 30 minutes. After 1 hour's reaction, the reaction mixture was charged on a column of silica gel (600 g., 60–80 mesh) in chloroform and eluted with a mixed solution of benzene-chloroform (1:1). The fraction containing 3-(2'-chlorophenyl)-5-methyl-4-isoxazolyl penicillin-p-nitrobenzyl ester was collected, followed by concentration in vacuo. The hydrogenation of the said concentrate was achieved in accordance with the process described in Example 27 to obtain 3-(2'-chlorophenyl)-5-methyl-4-isoxazolyl penicillin sodium slat as a lyophilizate.

Yield: 31 percent

EXAMPLE 29

Preparation of 3-phenyl-5-methyl-4-isoxazolyl penicillin-phenacyl ester:

31.9 g. (0.05 mole) of N-(3-phenyl-5-methyl-isoxazole-4-carbonyl)-benzylpenicillin phenacyl ester was dissolved in 165 ml. of distilled acetone. To this solution 6.93 g. (0.0525 mole) of sodium thiophenolate in 15 ml. of dimethylformamide was dropwise added. After the reaction continued for 30 minutes, 130 ml. of benzene was added thereto and washed with 250 ml. of 1 N HCl (pH 2) and 250 ml. of water in that order to remove unreacted thiophenolate and dimethylformamide. The reaction mixture was washed with 1 N sodium bicarbonate solution for three times to remove by-product 3-phenyl-5-methyl-4-isoxazolyl penicillin. The mixture was also washed twice with 60 ml. of water. After dehydration by anhydrous sodium sulfate, the reaction mixture was concentrated and then washed with petroleum ether three times to remove phenylacetate thiophenyl ester.

The thus-obtained crystalline compound was filtered and dried to yield 3-phenyl-5-methyl-4-isoxazolyl penicillin-phenacyl ester.

Yield: 17.8 g. (recovery: 67.1 percent)
M.p.: 118°–121° C.

Elementary analysis for $C_{27}H_{25}O_6N_3S$:

|  | C % | H % | N % |
|---|---|---|---|
| Found | 62.47 | 4.83 | 8.06 |
| Calculated | 62.41 | 4.87 | 8.09 |

EXAMPLE 30

Preparation of 3-(2'-chlorophenyl)-5-methyl-4-isoxazolyl penicillin phenacyl ester:

In Example 29, 3-phenyl-5-methyl-isoxazole-4-carbonyl benzyl-penicillin-phenacyl ester was replaced by 3-(2'-chlorophenyl)-5-methyl-isoxazole-4-carbonyl benzylpenicillin phenacyl ester to produce 3-(2'-chlorophenyl)-5-methyl-4-isoxazolyl penicillin phenacyl ester.

Yield: 64.5 percent

Elementary analysis for $C_{27}H_{24}O_6N_3SCl$:

|  | C % | H % | N % |
|---|---|---|---|
| Found | 58.21 | 4.40 | 7.49 |
| Calculated | 58.53 | 4.36 | 7.54 |

EXAMPLE 31

Preparation of 3-(2',6'-dichloropehnyl)-5-methyl-4-isoxazolyl penicillin phenacyl ester:

In Example 29, 3-phenyl-5-methyl-isoxazole-4-carbonyl-benzyl-penicillin phenacyl ester was replaced by 3-(2',6'-dichlorophenyl)-5-methyl-isoxazole-4-carbonyl benzylpenicillin phenacyl ester to produce 3-(2',6'-dichlorophenyl)-5-methyl-4-isoxazolyl penicillin phenacyl ester.

Yield: 49.5 percent

Elementary analysis for $C_{27}H_{23}O_6N_3SCl$:

|  | C % | H % | N % |
|---|---|---|---|
| Found | 54.90 | 3.91 | 7.09 |
| Calculated | 55.10 | 3.93 | 7.14 |

EXAMPLE 32

Preparation of 3phenyl-5-methyl-4-isoxazolyl penicillin sodium salt:

26.0 g. (0.05 mole) of 3-phenyl-5-methyl-4-isoxazolyl penicillin phenacyl ester obtained in Example 29 was dissolved in 90 ml. of distilled dimethylformamide. To this solution 7.62 g. (0.06 mole) of sodium thiophenolate in 15 ml. of dimethylformamide was dropwise added with stirring at 0°–3° C. over 15 minutes. After 30 minutes' reaction, butylacetate (100 ml.) was added thereto, followed by washing with 250 ml. of 1 N HCl (pH 2) and 250 ml. of water, in that order, to remove unreacted thiophenolate and dimethylformamide, respectively. The butylacetate layer was extracted twice with 30 ml. of 1 N sodium bicarbonate solution and water. The water layer and sodium bicarbonate solution layer were combined and extracted twice with 40 ml. of ethylacetate after adjusting the solution to pH 2 with 1 N HCl. After the ethylacetate layer was washed with water and dehydrated by anhydrous sodium sulfate, 10 g. of sodium 2-ethyl hexanoate in dry ethylacetate (35 ml.) was added thereto. The solution was concentrated in vacuo, filtered and washed with ethylacetate to obtain 3-phenyl-5-methyl-4-isoxazolyl penicillin sodium salt.

Yield: 12.1 g. (recovery: 55.2 percent)
M.p.: 193°–196° C. (decomposed)
Potency (bioassay): 860 mcg./mg. (purity: 100 percent)

EXAMPLE 33

Preparation of 3-(2'-chlorophenyl)-5-methyl-4-isoxazolyl penicillin sodium slat:

In Example 32, 3-phenyl-5-methyl-4-isoxazolyl penicillin phenacyl ester was replaced by 3-(2'-chlorophenyl)-5-methyl-4-isoxazolyl penicillin phenacyl ester obtained in Example 30 to produce 3-(2'-chlorophenyl)-5-methyl-4-isoxazolyl penicillin sodium salt.

Yield: 48.8 percent
M.p.: 194°–197° C. (decomposed)
Potency (bioassay): 930 mcg./mg.

Elementary analysis fro $C_{19}H_{17}O_5N_3SNaCl \cdot H_2O$

|  | C % | H % | N % |
| --- | --- | --- | --- |
| Found | 47.75 | 4.03 | 8.87 |
| Calculated | 47.95 | 4.02 | 8.83 |

EXAMPLE 34

Preparation of 3-(2',6'-dichlorophenyl)-5-methyl-4-isoxazolyl penicillin sodium slat:

In Example 32, 3-phenyl-5-methyl-4-isoxazolyl penicillin phenacyl ester was replaced by 3-(2',6'-dichlorophenyl)-5-methyl-4-isoxazolyl penicillin phenacyl ester obtained in Example 31 to produce the product hereinabove.

Yield: 41.7 percent
Potency (bioassay): 905 mcg./mg.

Elementary analysis for $C_{19}H_{16}O_5N_3SNaCl_2 \cdot H_2O$

|  | C % | H % | N % |
| --- | --- | --- | --- |
| Found | 45.03 | 3.51 | 8.11 |
| Calculated | 44.72 | 3.55 | 8.23 |

EXAMPLE 35

Preparation of 3-phenyl-5-methyl-4-isoxazolyl penicillin-p-nitrobenzyl ester:

34.5 g. (0.05 mole) of N-(3-phenyl-5-methyl-isoxazole-4-carbonyl)-benzylpenicillin-p-nitrobenzyl ester was dissolved in 170 ml. of distilled acetone. To this solution 9.9 g. (0.075 mole) of sodium thiophenolate in distilled dimethylformamide (25 ml.) was added dropwise at 0°–3° C. with stirring, over 15 minutes. After 30 minutes' reaction, 140 ml. of benzene was added thereto. The mixture was washed with 1 N HCl (250 ml., pH 2) and water (250 ml.) to remove unreacted thiophenolate and dimethylformamide. The organic solvent layer was washed with 1 N solution of sodium bicarbonate and water, in that order, then dehydrated with anhydrous sodium sulfate, concentrated in vacuo and washed with petroleum ether 3 times to remove phenylacetate thiophenyl ester. The concentrate was dissolved in dry benzene and lyophilized to obtain the product.

Yield: 15.1 g. (recovery: 57.0 percent)
M.p.: 64°–70° C.

Elementary analysis for $C_{26}H_{24}O_7N_4S$:

|  | C % | H % | N % |
| --- | --- | --- | --- |
| Found | 58.09 | 4.48 | 10.51 |
| Calculated | 58.20 | 4.50 | 10.44 |

EXAMPLE 36

Preparation of 3-(2'-chlorophenyl)-5-methyl-4-isoxazolyl penicillin-p-nitrobenzyl ester:

In Example 35, N-(3-phenyl-5-methyl-isoxazole-4-carbonyl)-benzylpenicillin-p-nitrobenzyl ester was replaced by N-]3-(2'-chlorophenyl)- 5-methyl-isoxazole-4-carbonyl]-benzyl-penicillin-p-nitrobenzyl ester to produce the product hereinabove.

Yield: 50.3 percent
Elementary analysis for $C_{26}H_{23}O_7N_4SCl$:

|  | C % | H % | N % | Cl % |
| --- | --- | --- | --- | --- |
| Found | 54.33 | 4.02 | 9.78 | 6.27 |
| Calculated | 54.68 | 4.04 | 9.81 | 6.20 |

EXAMPLE 37

Preparation of 3-(2',6'-dichlorophenyl)-5-methyl-4-isoxazolyl penicillin-p-nitrobenzyl ester:

In Example 35, N-(3-phenyl-5-methyl-isoxazole-4-carbonyl)-benzylpenicillin-p-nitrobenzyl ester was replaced by N-[3-(2',6'-dichlorophenyl)-5-methyl-isoxazole-4-carbonyl]-benzylpenicillin-p-nitro-benzyl ester to produce the product hereinabove.

Yield: 47.8 percent
Elementary analysis for $C_{26}H_{22}O_7N_4SCl_2$:

|  | C % | H % | N % | Cl % |
| --- | --- | --- | --- | --- |
| Found | 52.10 | 7.49 | 9.27 | 10.89 |
| Calculated | 51.51 | 7.66 | 9.25 | 11.71 |

EXAMPLE 38

Preparation of 3-phenyl-5-methyl-4-isoxazolyl penicillin sodium salt:

15.6 g. (0.028 mole) of 3-phenyl-5-methyl-4-isoxazolyl-penicillin-p-nitrobenzyl ester was dissolved in 100 ml. of dry ethylacetate. The solution was hydrogenated in the presence of 5 percent palladium-charcoal catalyst at room temperature under atmospheric pressure until no more hydrogen was absorbed (about 3 hours).

After washing twice with water, the organic solvent layer was extracted twice with a 1 N solution of sodium bicarbonate (30 ml.) and again washed twice with water (60 ml.). The extract and washing solution were combined, adjusted to pH 2 with 1 N HCl and extracted twice again with 40 ml. of ethylacetate. After the ethylacetate layer was washed with water and dehydrated with anhydrous sodium sulfate, 8.3 g. of sodium 2-ethyl hexanoate in dry ethyl acetate (30 ml.) was added thereto. The solution was concentrated in vacuo, filtered to remove precipitate therefrom then washed with dry ethylacetate to obtain the product.

Yield: 6.70 g. (recovery: 52.3 percent)
Potency (bioassay): 840 mcg./mg. (purity: 97.7 percent)

Elementary analysis for $C_{19}H_{18}O_5N_3SNa \cdot H_2O$

|  | C % | H % | N % |
| --- | --- | --- | --- |
| Found | 51.45 | 4.63 | 9.50 |
| Calculated | 51.70 | 4.57 | 9.52 |

EXAMPLE 39

Preparation of 3-(2'-chlorophenyl)-5-methyl-4-isoxazolyl penicillin sodium salt:

In Example 38, 3-phenyl-5-methyl-4-isoxazolyl penicillin-p-nitrobenzyl ester was replaced by 3-(2'-chlorophenyl)-5-methyl-4-isoxazolyl penicillin-p-nitrobenzyl ester obtained in Example 36 to produce the product hereinabove.

Yield: 48.2 percent
Potency (bioassay): 915 mcg./mg.

Elementary analysis for $C_{19}H_{17}O_5N_3SNaCl \cdot H_2O$

|  | C % | H % | N % |
| --- | --- | --- | --- |
| Found | 48.06 | 3.64 | 8.71 |
| Calculated | 47.96 | 3.60 | 8.83 |

EXAMPLE 40

Preparation of 3-(2',6'-dichlorophenyl)-5-methyl-4-isoxazolyl penicillin sodium salt:

In Example 38, 3-phenyl-5-methyl-4-isoxazolyl penicillin-p-nitrobenzyl ester was replaced by 3-(2',6'-dichlorophenyl)-5-methyl-4-isoxazolyl penicillin-p-nitrobenzyl ester obtained in Example 37 to produce the product hereinabove.

Yield: 42.3 percent
Potency (bioassay): 900 mcg./mg.

Elementary analysis for $C_{19}H_{16}O_5N_3SNaCl_2 \cdot H_2O$

|  | C % | H % | N % |
| --- | --- | --- | --- |
| Found | 45.06 | 3.51 | 8.18 |
| Calculated | 44.72 | 3.55 | 8.23 |

EXAMPLE 41

Preparation of N-(3-phenyl-5-methyl-isoxazole-4-carbonyl)-benzylpenicillin phenacyl ester: 0.105 continued 30°

45.2 g. (0.1 mole) of benzylpenicillin phenacyl ester was dissolved in dry benzene (200 ml.) After adding 32.4 ml. (0.4 mole) of dry pyridine at −7° C. with stirring, 21.8 g. (0.015 mole) of $PCl_5$ in dry benzene (250 ml.) was dropwise added for about 30 minutes. The reaction was continued for about 1.5 hours at −5° to −7° C. The precipitated pyridine hydrochloride was removed by filtration, and the reaction mixture was washed with a 1 N solution of sodium bicarbonate and water to remove unreacted $PCl_5$ and by-product $POCl_3$. After dehydration with anhydrous sodium sulfate, 3-phenyl-5-methyl-isoxazolyl-4-carboxylic acid (24.1 g., 0.1 mole) was added to the benzene layer. The reaction was continues at 30 −35° C. for 4 hours and at 45° C. for 1 hour. The reaction mixture was washed with 0.5 N HCl, 1 N sodium bicarbonate solution, saturated sodium chloride and water, in that order, to remove unreacted pyridine and 3-phenyl-5-methyl-isoxazolyl-4-carboxylic acid. After dehydration with anhydrous sodium sulfate, the mother liquor was concentrated in vacuo. The said concentrate was charged on a column of silica gel (150 g., 60–80 mesh) and eluted with anhydrous benzene-ethylacetate solution (20:1).

The first eluate contained the desired product.

Yield: 41.3 g. (recovery: 64.8 percent) as a lyophilizate

Elementary analysis for $C_{35}H_{31}O_7N_3S$:

|  | C % | H % | N % |
| --- | --- | --- | --- |
| Found | 65.78 | 4.75 | 6.78 |
| Calculated | 65.93 | 4.90 | 6.59 |

EXAMPLE 42

Preparation of N-[3-(2'-chlorophenyl)-5-methyl-isoxazole-4-carbonyl]-benzylpenicillin phenacyl ester:

Example 41 was repeated, except that 27.6 g. (0.1 mole) of 3-(2'-chlorophenyl)-5-methyl-isoxazolyl-4-carboxylic acid potassium salt was used in place of 3-phenyl-5-methyl-isoxazolyl-4-carboxylic acid potassium salt and the chlorination reaction was continued for 3 hours instead of 1.5 hours, and diacylation was continued for 1.5 hours at 30°–35° C. and 2.5 hours at 40° C., to obtain the desired product.

Yield: 48.6 g. (recovery: 72.3 percent)

Elementary analysis for $C_{35}H_{30}O_7N_3SCl$:

|  | C % | H % | N % |
| --- | --- | --- | --- |
| Found | 62.95 | 4.78 | 6.17 |
| Calculated | 62.55 | 4.50 | 6.25 |

EXAMPLE 43

Preparation of 3-phenyl-5-methyl-4-isoxazolyl penicillin sodium salt:

31.9 g. (0.05 mole) of N-(3-phenyl-5-methyl-isoxazole-4-carbonyl)-benzylpenicillin phenacyl ester was dissolved in 100 ml. of distilled dimethylformamide. To this solution 14.5 g. (0.11 mole) of sodium thiophenolate in distilled dimethylformamide (30 ml.) was dropwise added with stirring at 15° C. After 30 minutes' reaction, 120 ml. of butylacetate was added therein and washed with 250 ml. of 1 N HCl and 250 ml. of water to remove unreacted thiophenolate and dimethylformamide, respectively. The solvent layer was extracted twice with 60 ml. of 1 N sodium bicarbonate solution and washed twice with 60 ml. of water. After the said extracts and washings were combined and adjusted to pH 2, the solution was extracted twice with ethylacetate (120 ml.) The ethylacetate layer was washed with water, followed by dehydration with anhydrous sodium sulfate, and 8.3 g. of 2-ethyl hexanoate in dry ethylacetate (30 ml.) was added therein. The solution was concentrated in vacuo, then precipitate was collected by filtration.

Yield: 10.33 g. (recovery: 46.8 percent)

Potency (bioassay): 860 mcg./mg. (purity: 100 percent)

Elementary analysis for $C_{19}H_{18}O_5N_3SNa \cdot H_2O$

|  | C % | H % | N % |
| --- | --- | --- | --- |
| Found | 51.74 | 4.44 | 9.47 |
| Calculated | 51.70 | 4.57 | 9.52 |

EXAMPLE 44

Preparation of 3-phenyl-5-methyl-4-isoxazolyl penicillin sodium salt:

In Example 43, the conditions of the reaction between N-(3-phenyl-5-methyl-isoxazole-4-carbonyl)-benzylpenicillin phenacyl ester and sodium thiophenolate were replaced by the conditions −5° to 0° C. temperature and 1 hour duration to yield the product.

Yield: 7.28 g. (recovery: 33.0 percent)

Potency (bioassay): 860 mcg./mg. (purity: 100 percent)

EXAMPLE 45

Preparation of 3-phenyl-5-methyl-4-isoxazolyl penicillin sodium salt:

31.9 g. (0.05 mole) of N-(3-phenyl-5-methyl-isoxazole-4-carbonyl)-benzylpenicillin phenacyl ester was dissolved in 100 ml. of distilled dimethylformamide. To this solution, 18.3 g. (0.11 mole) of p-chlorothiophenolate in dimethylformamide (30 ml.) was added with stirring at −5° to 0° C. over 15 minutes. After 1 hour's reaction, the procedure of Example 43 was followed to obtain the product.

Yield: 8.01 g. (recovery: 36.3 percent)

Potency (bioassay): 850 mcg./mg. (purity: 98.8 percent)

Elementary analysis for $C_{19}H_{18}O_5N_3SNa \cdot H_2O$

|  | C % | H % | N % |
| --- | --- | --- | --- |
| Found | 51.46 | 4.62 | 9.51 |
| Calculated | 51.70 | 4.57 | 9.52 |

EXAMPLE 46

Preparation of 3-phenyl-5-methyl-4-isoxazolyl penicillin sodium salt:

In Example 41, dimethylformamide was replaced by acetone to produce the desired product.

Yield: 31.1 percent

Potency (bioassay): 850 mcg./mg. (purity: 98.8 percent)

EXAMPLE 47

Preparation of 3-(2'-chlorophenyl)-5-methyl-4-isoxazolyl penicillin sodium salt:

33.6 g. (0.05 mole) of N-[3-(2'-chlorophenyl)-5-methyl-isoxazole-4-carbonyl] benzylpenicillin phenacyl ester was dissolved in 100 ml. of distilled ethylacetate. To this solution, 14.5 g. (0.11 mole) of sodium thiophenolate in dimethylformamide (30 ml.) was dropwise added with stirring at −5° to 0° C. over 15 minutes. After 1 hour, the reaction mixture was washed with 130 ml. of 1 N HCl and 130 ml. of water to remove unreacted thiophenolate. The ethylacetate layer was extracted twice with 60 ml. of 1 N sodium bicarbonate solution and washed twice with 60 ml. of water. The solution was adjusted to pH 2 with 1 N HCl, then extracted twice with 120 ml. of ethylacetate. The thus-extracted layer was washed with water and dehydrated with anhydrous sodium sulfate; 8.3 g. of sodium 2-ethylhexanoate in dry ethylacetate (30 ml.) were added thereto and the mixture was concentrated in vacuo. The precipitated material was collected, washed with ethylacetate and dried in vacuo to yield 3-(2'-chlorophenyl)-5-methyl-4-isoxazolyl penicillin sodium salt.

Yield: 8.49 g. (recovery: 37.6 percent)

Potency (bioassay): 950 mcg./mg.

Elementary analysis for $C_{19}H_{17}O_5N_3SNaCl \cdot H_2O$

|  | C % | H % | N % |
| --- | --- | --- | --- |
| Found | 48.18 | 3.69 | 8.74 |
| Calculated | 47.96 | 3.60 | 8.83 |

EXAMPLE 48

Preparation of 3-(2',6'-dichlorophenyl)-5-methyl-4-isoxazolyl penicillin sodium salt:

35.3 g. (0.05 mole) of N-[3-(2',6'-dichlorophenyl)-5-methyl-isoxazole-4-carbonyl]-benzylpenicillin phenacyl ester was dissolved in 100 ml. of dimethylformamide. To this solution 14.5 g. (0.11 mole) of sodium thiophenolate in dimethylformamide (30 ml.) was dropwise added with stirring at −5° to 0° C. over 15 minutes. After 1 hour, the reaction mixture was treated by the same procedure as in Example 47 to produce the desired product.

Yield: 4.67 g. (recovery: 18.3 percent)
Potency (bioassay): 910 mcg./mg.

Elementary analysis for $C_{19}H_{16}O_5N_3SNaCl_2 \cdot H_2O$:

|  | C % | H % | N % |
|---|---|---|---|
| Found | 45.10 | 3.53 | 8.16 |
| Calculated | 44.72 | 3.55 | 8.23 |

EXAMPLE 49

Preparation of 3-phenyl-5-methyl-4-isoxazolyl penicillin sodium salt:

35.8 g. (0.05 mole) of N-(3-phenyl-5-methyl-isoxazole-4-carbonyl) benzylpenicillin-p-bromophenacyl ester was dissolved in 100 ml. of dimethylformamide. To this solution 14.5 g. (0.11 mole) of sodium thiophenolate in dimethylformamide (30 ml.) was dropwise added at −5° to 0° C. with stirring over 15 minutes. After 1 hour, the reaction mixture was treated by the same procedure as in Example 43 to obtain the desired product.

Yield: 33.0 percent
Potency (bioassay): 855 mcg./mg. (purity: 99.4 percent)

EXAMPLE 50

Preparation of 3-(2'-chlorophenyl)-5-methyl-4-isoxazolyl penicillin sodium salt:

37.6 g. (0.05 mole) of N-[3-(2'-chlorophenyl)-5-methyl-isoxazole-4-carbonyl]benzylpenicillin-p-bromophenacyl ester was dissolved in 100 ml. of dimethylformamide. To this solution 14.5 g. (0.11 mole) of sodium thiophenolate in dimethylformamide (30 ml.) was dropwise added with stirring at −5° to 0° C. over 15 minutes. After 1 hour, the reaction mixture was treated by the same procedure as in Example 43 to obtain 3-(2'-chloro-phenyl)-5-methyl-4-isoxazolyl penicillin sodium salt.

Yield: 30.5 percent
Potency (bioassay): 940 mcg./mg.

Having described our invention we claim:

1. A process for the production of a member selected from the group consisting of isoxazolyl penicillins having the formula

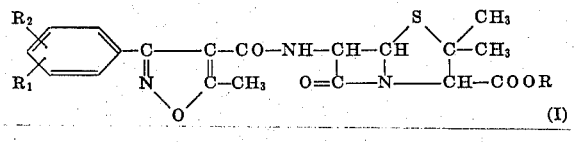

(I)

and nontoxic salts and lower alkyl esters thereof, wherein R is a member selected from the class consisting of hydrogen and lower alkyl and $R_1$ and $R_2$ are each a member selected from the group consisting of hydrogen and halogen, comprising reacting a penicillin G ester having the formula

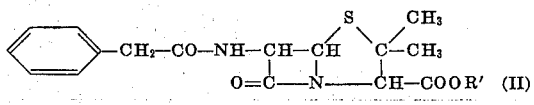

(II)

wherein R' is a protective group for carboxyl group and is selected from the group consisting of lower alkyl of $C_{1-4}$, p-methoxybenzyl, benzyl, p-nitrobenzyl, benzhydril, phenacyl, p-bromophenacyl and trimethylsilyl, with a chlorinating agent selected from the group consisting of $PCl_5$, $PCl_3$, $POCl_3$, $COCl_2$ and $SOCl_2$, in the presence of pyridine to obtain an imide chloride group-incorporated compound having the formula

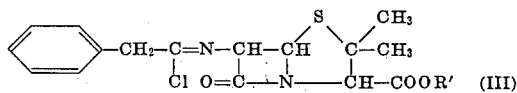

(III)

wherein R' is as defined above; reacting the compound of Formula III with an isoxazol carboxylate having the formula

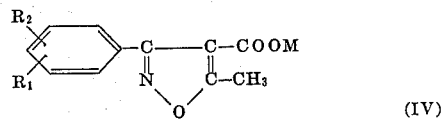

(IV)

wherein M is a metal atom, and $R_1$ and $R_2$ are as defined above, to obtain a diacyl penicillin ester having the formula

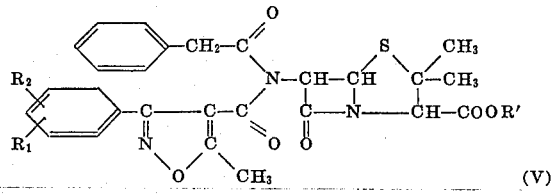

(V)

wherein $R_1$, $R_2$ and R' are as defined above; then subjecting the compound of Formula V to dephenylacetylation; and eliminating R' when R' is a group other than said lower alkyl.

2. A process according to claim 1, wherein the carboxyl group protected penicillin G is in the form of a mixture of 1 mole thereof with 1–2 moles of chlorinating agent in the presence of 1–5 moles of pyridine, and the reaction is carried out at a temperature of −20° to 25° C.

3. A process according to claim 1, wherein the imide chloride group-incorporated compound of Formula III is used in the form of a mixture of 1 mole thereof with 1–2 moles of isoxazol carboxylate of Formula IV, and the reaction is carried out at a temperature of 20° to 50° C.

4. A process according to claim 1, wherein the diacyl penicillin ester of Formula V is used in the form of a mixture of 1 mole thereof with 1–2 moles of aminolyzing agent selected from the group consisting of primary organic amine and ammonia, and the reaction is carried out at a temperature of −5° to 40° C.

5. A process according to claim 4, wherein the aminolyzing agent is pyridine.

6. A process according to claim 1, wherein the diacyl penicillin ester of Formula V is used in the form of a mixture of 1 mole thereof with 1–4 moles of thiophenolate, and the reaction is carried out at a temperature of −5° to 40° C.

* * * * *